E. L. AIKEN.
MOVING PICTURE APPARATUS.
APPLICATION FILED NOV. 8, 1905.

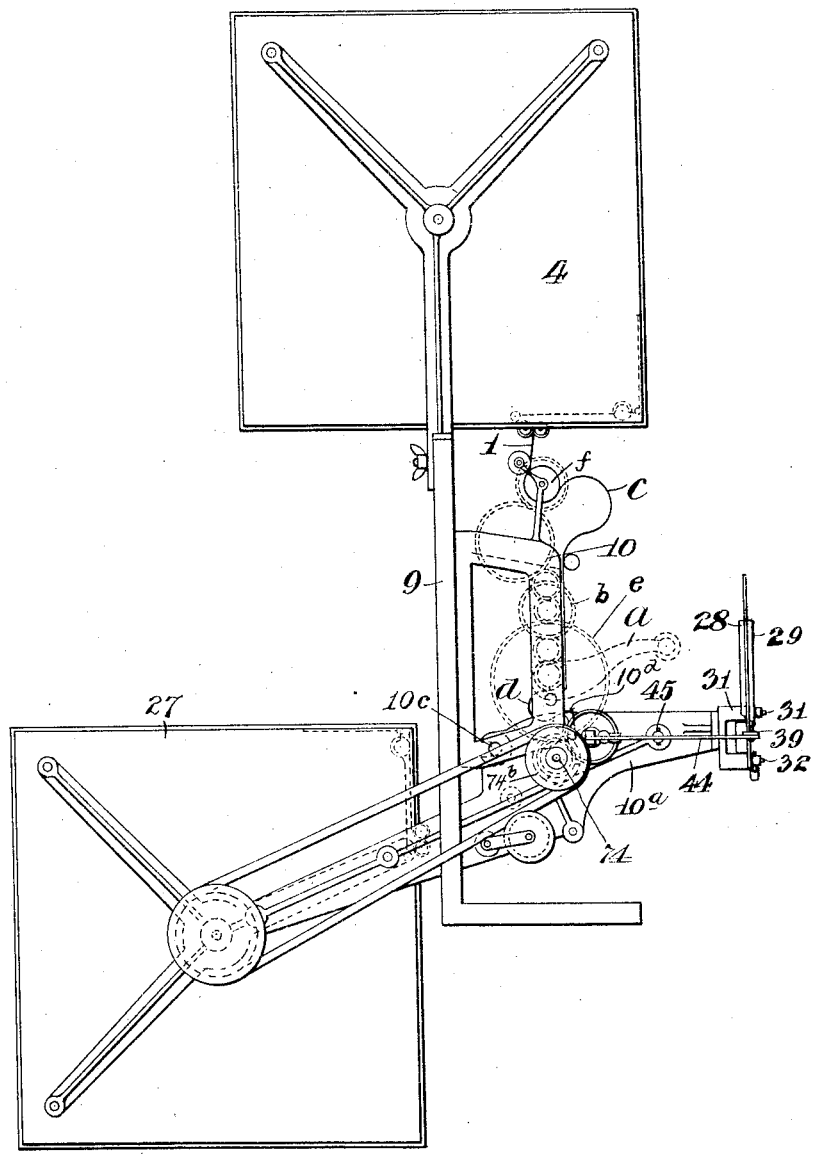

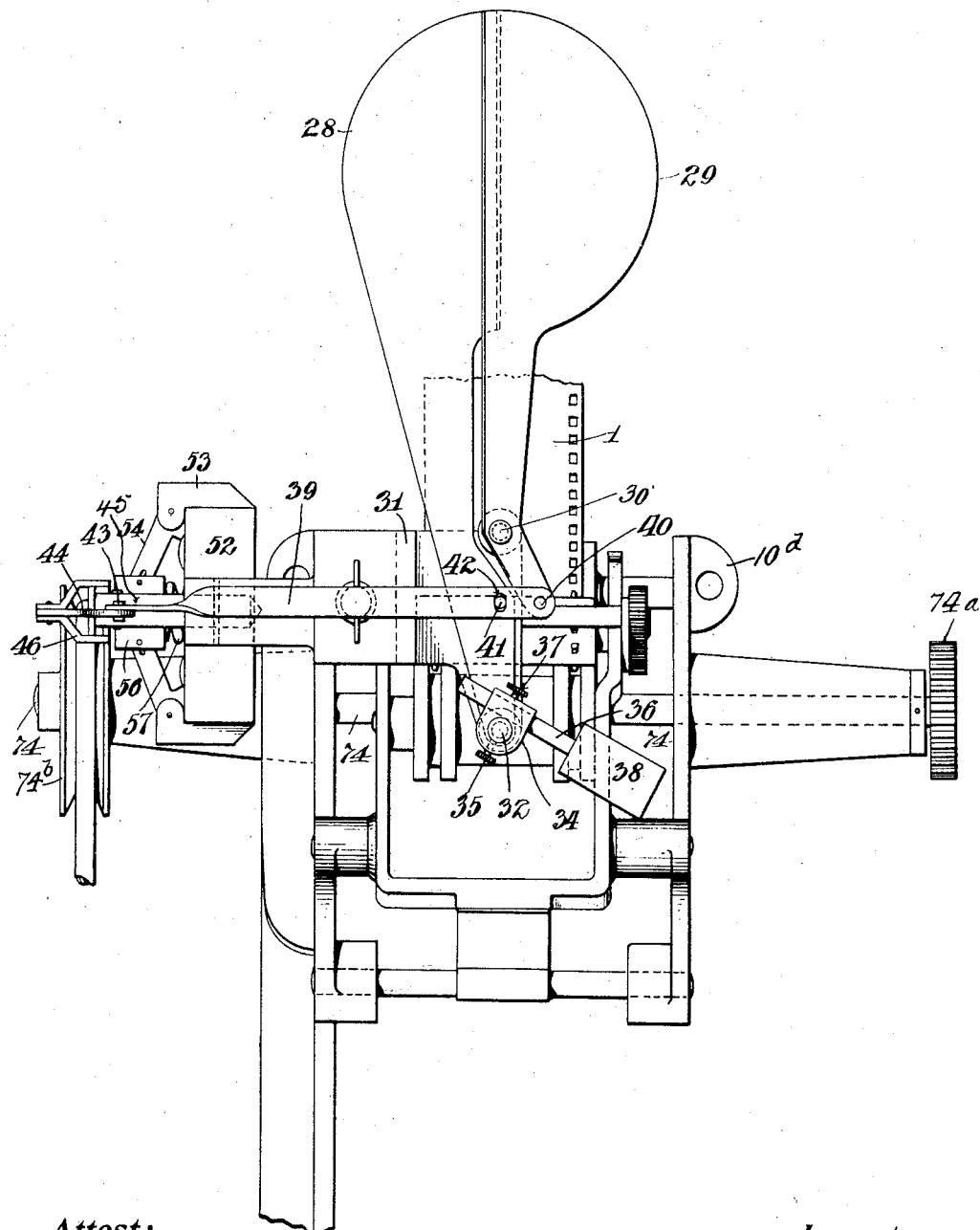

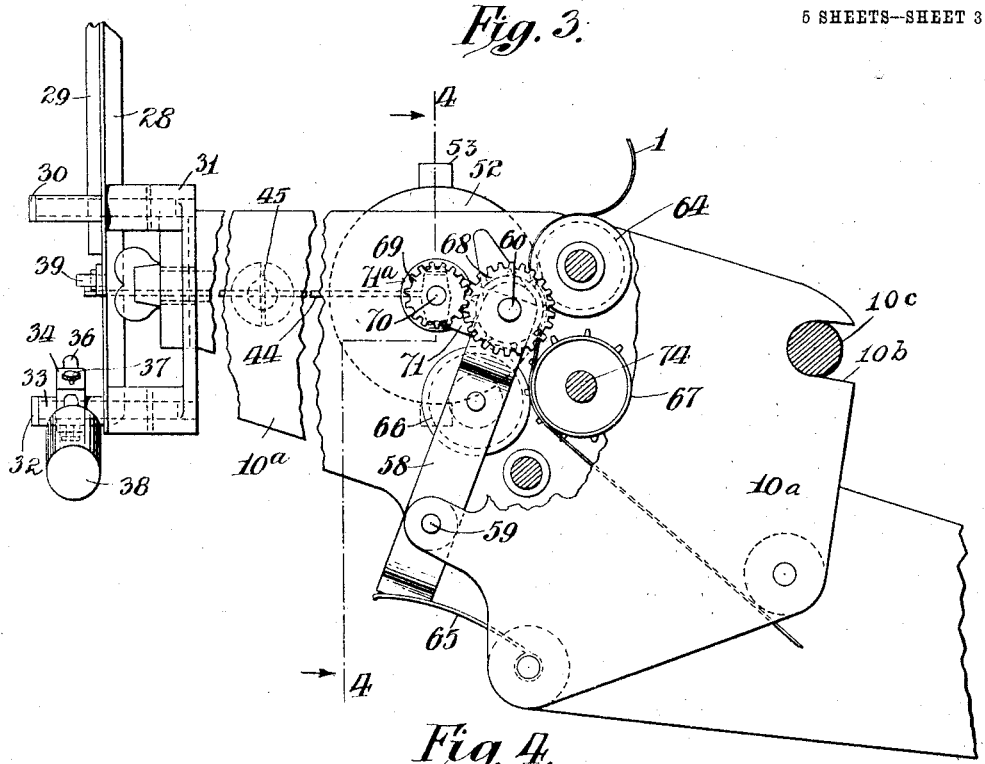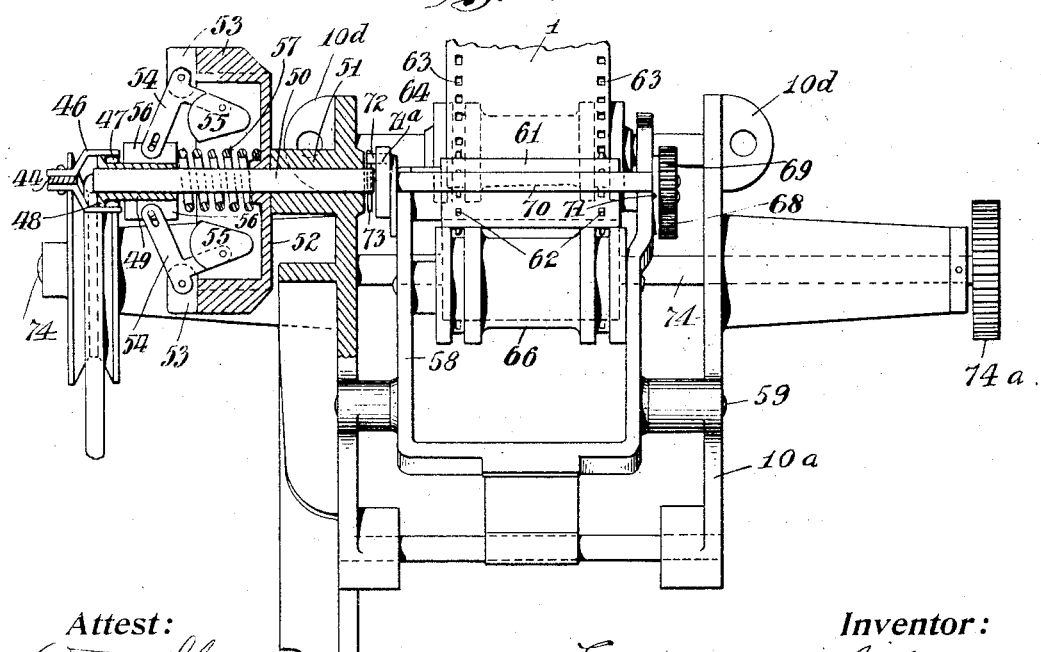

1,037,188.

Patented Sept. 3, 1912.
5 SHEETS—SHEET 4.

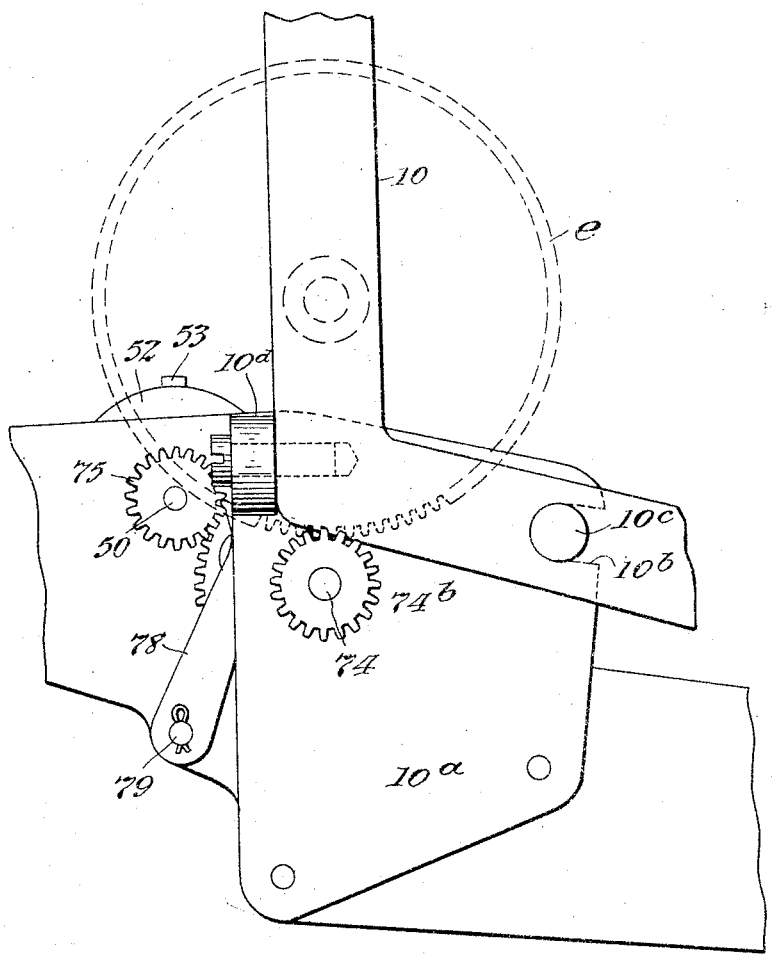

UNITED STATES PATENT OFFICE.

EDWARD L. AIKEN, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

MOVING-PICTURE APPARATUS.

1,037,188.

Specification of Letters Patent. Patented Sept. 3, 1912.

Application filed November 8, 1905. Serial No. 286,424.

*To all whom it may concern:*

Be it known that I, EDWARD L. AIKEN, a citizen of the United States, residing at East Orange, in the county of Essex and State of New Jersey, have invented certain new and useful Improvements in Moving-Picture Apparatus, of which the following is a description.

My invention relates to apparatus for the projecting of moving pictures. In apparatus of this character, as I have pointed out in an application filed on April 12, 1905, Serial No. 255,100, Patent No. 967,293, granted August 16, 1910, it is important that the film upon which the pictures are carried shall not be exposed to the heat which accompanies the projecting light for more than a very brief interval of time, because such films are composed of celluloid and the heat referred to is sufficient to ignite such a film very quickly. Ordinarily, since the film travels rapidly past the opening through which the pictures are projected it does not become heated to a dangerous extent, but in case the mechanism becomes deranged so as not to properly feed the film, or in case the operator fails to properly operate the said mechanism, the film may become ignited with disastrous results, since the projecting apparatus is often situated very close to inflammable materials, as when used in theaters, etc. In the application above referred to, I have described and broadly claimed means for automatically cutting off the beam of light from the film when the same is not being moved.

In the present application my object is the provision of an improved form of apparatus designed for automatically performing this function, and capable of being applied as an attachment to ordinary projecting machines now in use.

With these ends in view my invention consists in the features hereinafter described and claimed.

Figure 5:
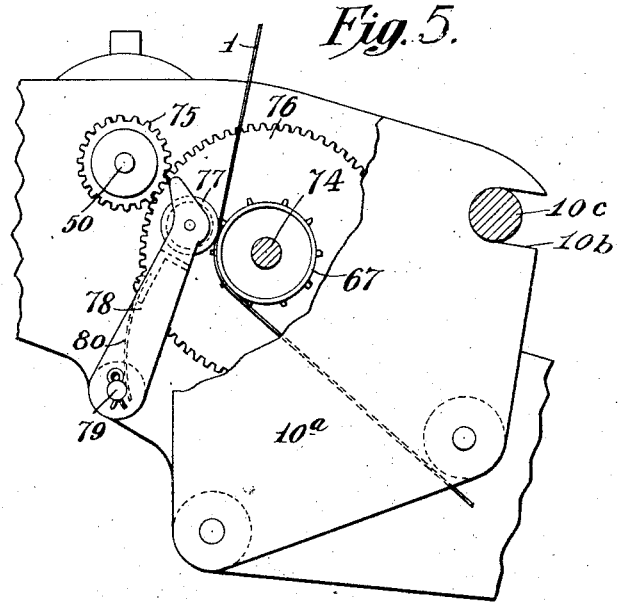
Figure 6:
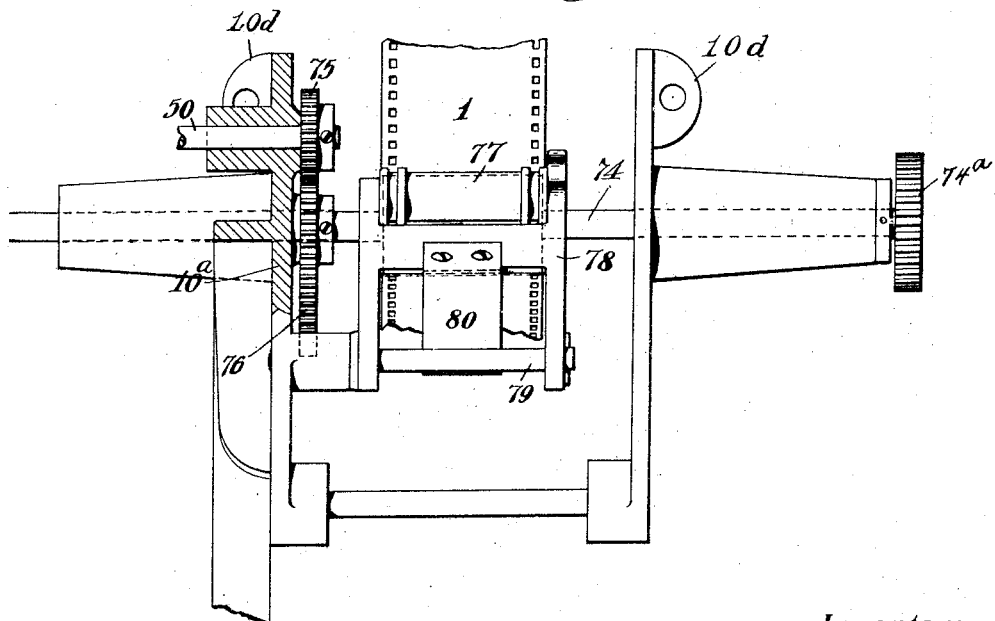

Referring to the accompanying drawings, Figure 1 is a side elevation of a complete apparatus constructed in accordance with my invention. Fig. 2 is a rear elevation showing the shutter and operating parts for automatically cutting off the projecting light. Fig. 3 is a side elevation partly broken away of the parts shown in Fig. 2 when viewed from the right. Fig. 4 is a section on line 4—4 of Fig. 3. Figs. 5 and 6 are views similar to Figs. 3 and 4 respectively and illustrating a modification thereof. Fig. 7 is a detail view showing the means by which the frame $10^a$ is secured to the frame 10.

In all the views the corresponding parts are designated by the same numerals of reference.

In the boxes or receptacles 4 and 27 are located the supply and take-up reels respectively for the traveling film 1. These boxes or film holders 4 and 27 form the subject matter of a divisional application Serial No. 711,399, filed July 25, 1912.

The mechanism for moving the film 1, step by step into the field of the projecting light is of the usual type comprising a continuous sprocket $f$ which forms a loop $c$ above the display opening and an intermittent feed sprocket immediately below the opening, a drive gear $e$ and gear train $b$ driven by the usual crank $a$ as indicated in dotted lines, Fig. 1, said gears and sprockets being all mounted in the frame 10. My improved attachment for automatically cutting off the light when the film is stationary comprises a frame $10^a$ having a groove $10^b$ for engaging the rod $10^c$ of the frame 10, and ears $10^d$ to receive bolts for rigidly clamping the two frames together. A shaft 74 is journaled in the frame $10^a$ and in proper position for the gear $74^a$ which is mounted on one end thereof to mesh with the drive gear $e$. This shaft 74 carries at its opposite end a pulley $74^b$ for driving the take-up reel which is carried by the frame $10^a$ and also carries a sprocket 67 (Figs. 3 and 5) for maintaining the loop $d$ (Fig. 1).

The shutter is composed of two pivoted members 28 and 29 (Fig. 2) which are situated directly behind the display opening and adapted to move away from each other to permit the light to pass and to move toward each other until they overlap as shown, in order to completely cut off the light. These members are preferably of aluminum in order that they may be very light and at the same time possess considerable rigidity. The plate 29 is pivoted on a pin 30 carried by the support 31, the said support being secured to the frame $10^a$ secured to the frame 10. The plate 28 is pivoted on a pin 32 also carried by the support 31. Upon the hub 33 of the plate 28 is secured a sleeve 34 held by a set screw 35 and through said sleeve passes a longitudinally adjustable rod 36 held by a set screw 37, and carrying at one end a weight 38 for counterbalancing the plate 28 with respect to the pivot 32. An operating link 39 is pivoted at 40 to the lower end of the plate 29 and is operatively connected with the plate 28 by means of a pin 41 carried by said plate and engaging a slot 42 in the said link. The other end of the link 39 is pivoted at 43 to one end of a lever 44 whose fulcrum is at 45 where it is pivoted to the frame 10ª. This lever carries at its forward end a fork 46 having inwardly extending fingers 47 (Fig. 4) adapted to be engaged by a flange 48 formed on the outer end of the sleeve 49. This sleeve is slidable upon the shaft 50 which is journaled in a bearing 51 formed in the frame 10ª. Rigidly secured to the shaft 50 is a cupped disk 52 provided with ears 53, 53 to which are pivoted bell crank levers 54, 54. Each of these levers carries at one end a weight 55 situated within the body of the disk 52 and at its other end is connected to a wing 56 of the sleeve 49 by a pin and slot connection as shown. Between the sleeve 49 and disk 52 and surrounding the shaft 50 is a coil spring 57 which tends to separate the said parts. The arrangement of the parts described is such that when the shaft 50 is at rest the positions assumed are such as are illustrated in the drawings, the shutter plates 28 and 29 being together as indicated in Fig. 2 and the sleeve 49 being at its extreme outward limit of movement. Obviously the parts will be brought to this position by the operation of the spring 57 and the weight 38.
When the shaft 50 however attains a speed sufficient to overcome the inertia and friction of the various parts, the centrifugal weights 55 will move the levers 54 upon their pivots and the said levers will slide the sleeve 49 upon the shaft 50, thereby compressing the spring 57 and operating the lever 44 and link 39 which cause the shutter plates 28 and 29 to turn on their pivots in opposite directions and permit the light used for projecting the pictures to pass therebetween. When the shaft 50 ceases to revolve or falls below a given speed the parts will return to the positions shown. The shaft 50 may be driven either by the traveling film 1 or directly from the gear train operated by the crank a, the first arrangement being illustrated in Figs. 3 and 4, and the second in Figs. 5 and 6.

In Figs. 3 and 4 a frame 58 is pivoted at 59 to the frame 10ª and carries at its free end a shaft 60 upon which is mounted a cylinder 61 having two sets of teeth 62 for engaging the usual apertures 63 of the film 1, the film being held in engagement with said teeth by a roller 64 carried by the frame 10ª and against which the roller 61 is held by the action of the spring 65 pressing against the lower end of the frame 58. This spring acts as a double throw spring and holds the frame 58 in an open position when it is desired to thread the film through the apparatus. A roller 66 is carried by the frame 58 and presses against the continuous feed sprocket 67 carried on the shaft 74. Upon one end of the shaft 60 is a spur gear 68 which meshes with a similar gear 69 carried by the end of a countershaft 70 which is journaled in the arms 71 of the frame 58 and carries at its opposite end a disk 71ª having a crank pin 72 for engaging a pin 73 which passes through the shaft 50. This driving connection between the shaft 70 and shaft 50 obviously permits of the frame 58 being turned on its pivot 59 when it is desired to thread a film through the apparatus.

It is obvious that as the film is drawn through the projecting apparatus by the sprocket 67, it will cause the shaft 60 to be rotated by reason of the sprocket teeth 62, thereby operating the shutter-controlling shaft 50, and in case of any stoppage on the part of the operator or any breakage of the film, the said shaft 50 will come to rest and the shutter will close.

In the device of Figs. 5 and 6 the shaft 50 is driven from the shaft 74 upon which the feed sprocket 67 is carried, by means of spur gears 75 and 76 carried by said shafts respectively. The film 1 is held in engagement with the sprocket 67 by a roller 77 carried at the free end of a frame 78 which is pivoted on a pin 79 carried by the frame 10ª and held in any desired position by a spring 80 secured to the frame 78 at one end and bearing against the pivot pin 79 at its free end.

Since the shaft 74 is in driving connection with the gear e driven by the crank a, it is obvious that any stoppage of the driving crank will cause the shutter to close. The breakage of the film will not automatically close the shutter, but on the other hand the film will not be subjected to the wear which inevitably occurs when the film is used for driving the shutter controlling mechanism.

Having now described my invention, what I claim as new therein and desire to secure by Letters Patent is as follows:

1. In a moving picture apparatus, a shutter comprising a pair of pivoted plates, an operating rod connected to both of said plates at points which occupy relatively opposite positions with respect to the pivots of said plates, and means controlled by the film-driving mechanism for operating said rod, thereby turning said plates on their pivots in opposite directions, substantially as set forth.

2. In a moving picture apparatus, a shutter comprising a pair of pivoted plates, an operating rod connected to both of said plates at points which occupy relatively opposite positions with respect to the pivots of said plates, means controlled by the film-driving mechanism for operating said rod, thereby turning said plates on their pivots in opposite directions, and a counterweight for returning said plates to their closed position, substantially as set forth.

3. In a moving picture apparatus, the combination of film driving mechanism, a shutter comprising a pair of plates pivoted at different points, extending substantially vertically with respect to their pivots and adapted to move toward and away from each other, rotary means controlled by the film driving mechanism, a member movable thereby, connections between said plates and to said member therefrom for moving said plates on their pivots away from each other, and a weighted lever connected to one of said plates at the pivot of said plate for causing said plates to move toward each other, substantially as set forth.

4. In a moving picture apparatus, the combination of film driving mechanism, a shutter comprising a pair of plates pivoted at different points, extending substantially vertically with respect to their pivots and adapted to move toward and away from each other, the pivot of one plate being above that of the other plate, said first named plate having an extension below its pivot, a connection from said extension to the second plate above the pivot of the latter, connections from the film driving mechanism for moving said plates pivotally away from each other, and a counterbalance eccentrically secured to said second plate at the pivot thereof for causing said plates to move toward each other, substantially as set forth.

5. In a moving picture apparatus, the combination with a frame or support carrying a shutter, a shaft and centrifugal weights for operating said shutter, of an auxiliary frame pivoted to the shutter-carrying frame and carrying at its free end a sprocket adapted to engage the traveling film, and a driving connection between the sprocket shaft and shutter operating shaft, substantially as set forth.

6. In a moving picture apparatus, the combination with a frame or support carrying a shutter, a shaft and centrifugal weights for operating said shutter, an auxiliary frame pivoted to the shutter-carrying frame and carrying at its free end a sprocket adapted to engage the traveling film, a spring for holding said frame in position for said engagement and a driving connection between the sprocket shaft and shutter operating shaft, substantially as set forth.

7. In a moving picture apparatus, a shutter comprising a pair of pivoted plates, a rod connected to both of said plates at points which occupy relatively opposite positions with respect to the pivots of said plates, and means controlled by the film-driving mechanism and including said rod for turning the plates on their pivots in opposite directions, substantially as described.

8. In a moving picture apparatus, a shutter comprising a pair of pivoted plates, a rod connected to both of said plates at points which occupy relatively opposite positions with respect to the pivots of said plates, means controlled by the film-driving mechanism and including said rod for turning the plates on their pivots in opposite directions, and a counterweight for returning said plates to their closed position, substantially as described.

This specification signed and witnessed this 6th day of November 1905.

EDWARD L. AIKEN.

Witnesses:
FRANK L. DYER,
DELOS HOLDEN.

Copies of this patent may be obtained for five cents each, by addressing the "Commissioner of Patents, Washington, D. C."